Patented Nov. 12, 1940

2,221,362

UNITED STATES PATENT OFFICE 2,221,362

METAL COMPOUNDS OF AZO DYESTUFFS

Max Schmid, Riehen, near Basel, Switzerland, assignor to the firm Society of Chemical Industry in Basle, Basel, Switzerland No Drawing. Original application September 27, 1937, Serial No. 166,021. Divided and this application March 23, 1939, Serial No. 263,796. In Switzerland October 3, 1936

11 Claims. (Cl. 260—147)

This is a division of my application for patent Serial No. 166,021, filed in U. S. A. on September 27, 1937, and in Switzerland on October 3, 1936, of which the following is a full, clear and exact specification.

According to this invention valuable products are obtained by treating with an agent yielding metal, such as a compound of copper, chromium, nickel, iron or cobalt, in substance or on the fibre, an azo dyestuff which is obtainable by the action of such a diazo-compound of the benzene and naphthalene series which contains in ortho-position to the diazo-group a substituent which is capable of forming stable lakes with the azo-group formed, such as an ortho-hydroxy or ortho-carboxyl-diazo compound on a 1-aryl-5-pyrazolone which itself is obtainable by condensation of a β-carbonyl-carboxylic acid ester with a hydrazine of the general formula

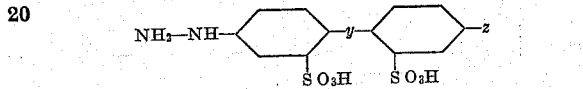

in which $y$ represents a —CH=CH-group or a —CH$_2$—CH$_2$-group and $z$ represents a group which is formed by reduction of a nitro-group in combination with a condensation, such as an azo- or azoxy-group or an amino-group substituted by the residue of an organic acid. The new azo dyestuffs containing metal thus obtained are distinguishd by the high fastness to light of their dyeings and by their excellent affinity for vegetable fibres, such as cotton, flax, ramie, and for fibres of regenerated cellulose, such as artificial silks, for example viscose artificial silk or cuprammonium artificial silk.

Among the ortho-hydroxy and ortho-carboxy-diazo compounds which come into consideration for the preparation of the azo dyestuffs forming the parent materials of the invention there may be named quite generally those derived from ortho-aminophenols or ortho-aminonaphthols or from ortho-aminocarboxylic acids of the benzene or naphthalene series, for example 1-hydroxy-2-aminobenzene, 1-hydroxy-2-amino-4-chlorobenzene, 1-hydroxy-2-amino-4-nitrobenzene, 1-hydroxy-2-amino-5-nitrobenzene, 1-hydroxy-2-amino-4:6-dinitrobenzene, 1-hydroxy-2-amino-5-nitro-6-chlorobenzene, 1-hydroxy-2-amino-4-methyl-benzene, 1-hydroxy-2-amino-4-nitro-6-chlorobenzene, 1-hydroxy-2-amino-4-nitrobenzene-6-sulfonic acid, 1-hydroxy-2-amino-6-nitrobenzene-4-sulfonic acid, 1-hydroxy-2-aminobenzene-4-sulfamide, 1-hydroxy-2-aminonaphthalene-4:8-disulfonic acid, 2-hydroxy-1-aminonaphthalene-4-sulfonic acid, 2-hydroxy-1-amino-6-nitronaphthalene-4-sulfonic acid, 1-aminobenzene-2-carboxylic acid, 1-amino-4-chlorbenzene-2-carboxylic acid, 1-amino-4-nitrobenzene-2-carboxylic acid, 1-amino-4-benzoylamino-2-carboxylic acid, 4-amino-3-carboxylic-azo-benzene-4-sulfonic acid, aminosulfobenzoic acid (NH$_2$:1, COOH:2, SO$_3$H:4), 2-aminonaphthalene-3-carboxylic acid, and so on.

Among the β-carbonyl-carboxylic acid esters available for preparing the 1-aryl-5-pyrazolones which can be used for the synthesis of the parent dye stuffs there may be named formyl acetic acid esters, furthermore β-keto-carboxylic acid esters, such as ethyl-aceto-acetate, ethyloxal acetate, ethylbenzoylacetate, terephthaloyldiacetic acid ethyl ester, and so on. Among the hydrazines which likewise are used for preparing the 1-aryl-5-pyrazolones used for the synthesis of the parent dyestuffs there may be named such products as:

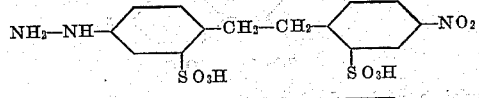

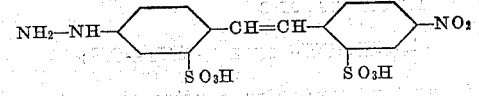

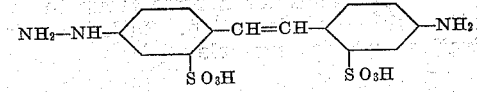

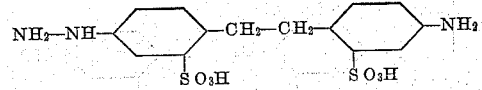

Quite generally, however, it is more advantageous first to combine the nitrohydrazine or the aminohydrazine with one of the aforesaid β-carbonyl-carboxylic acid esters and then to conduct the reduction of the nitro-group in combination with a condensation reaction. This may occur, for example, by cautious reduction by means of crape-sugar, the course of the reaction being presumed to consist in the reduction of a part of the product to the amino-group, which then condenses with the unreduced or only partially reduced portions to produce an azo or azoxy compound (compare Formulae 8 and 10 below which is the particular subject of the present application); or the operation may consist in complete reduction of the nitro-group to the NH$_2$-group and subsequent condensation, for example with a halogen compound which converts the NH$_2$-group into a

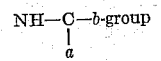

in which a stands for metalloid whose atomic weight is not less than 14 and not greater than 16, and b stands for an organic residue of the aliphatic, aromatic, cycloaliphatic, heterocyclic, araliphatic series and so on. Such products constitute acyl derivatives or the amidines which chemically are closely related thereto. As is known, the introduction of such residues into intermediate products or dyestuffs increase the affinity for vegetable fibre. Such residues can be introduced by acylation, for example by treatment with benzoyl chloride, phenylacetyl chloride, cinnamyl chloride, succinyl chloride, butyryl chloride, hexahydrobenzoyl chloride, furane-carboxylic acid chloride, benzimino ether, by treatment with phosgene which is the particular subject of the parent application Serial No. 166,021, filed Sept. 27, 1937 or thiophosgene or by treatment with heterocyclic products of the nature of amidine halides, such as cyanuric acid chloride, cyanuric acid bromide, tribromopyrimidine, 2:6-dichloro-4-methylpyridine, dichloroquinazoline, and so on. The manufacture of such products containing heterocyclic rings is the particular subject of my co-pending application Serial No. 263,795, filed March 23, 1939, which copending application is also a divisional application of my parent application Serial No. 166,021, filed September 27, 1937.

Particularly valuable products result when the condensation is conducted in such a manner that the residue b is so constituted that it contains an azochromophore or is adapted to couple with diazo compounds to produce azodyestuffs. There are thus obtained 1-aryl-5-pyrazolones in which the aryl residue has the general formula:

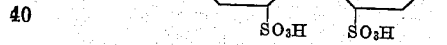

in which y stands for a

—CH=CH- or a —CH₂—CH₂- group and z stands for a nitro-group in combination with a condensation. Such pyrazolone derivatives are, for example:

(1) 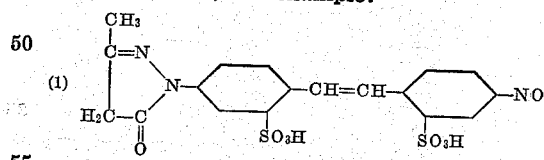

(2) 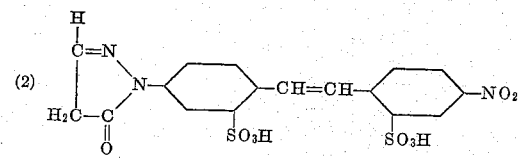

(3) 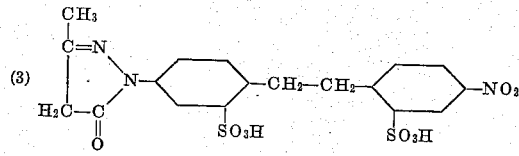

(4) 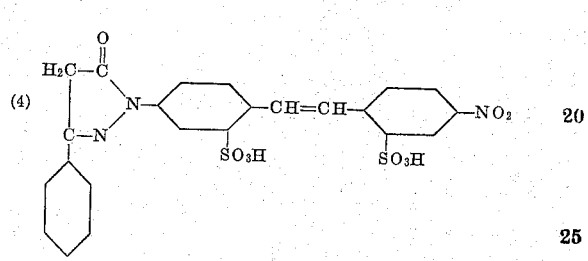

(5) 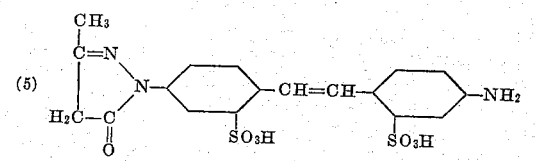

(6) 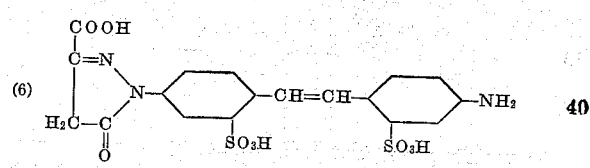

(7) 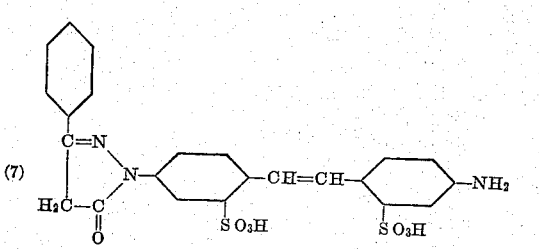

(8) 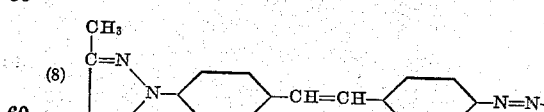

(9) 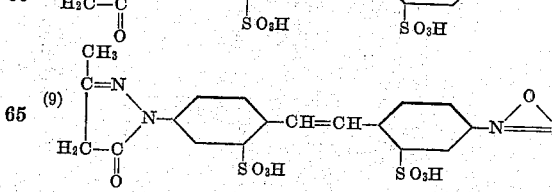

(10) 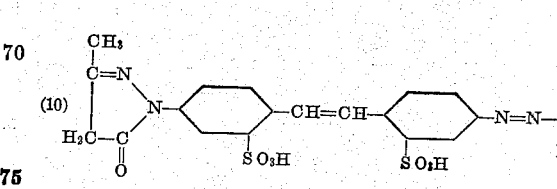

From a comparison of the pyrazolone nuclei of the products of the Formulae 1–7 with those of the products resulting from the reduction of a nitro-group together with a condensation shown in Formulae 5–10, all of which are given by way of example, it is evident how numerous are the intermediate products for making the dyestuffs forming the parent materials for the invention; regard must further be had to the fact that the group during metallisation) or a COO-alkyl-group which is then saponified to a COOH-group. The metallization can also occur simultaneously with the coupling of the azo dyestuff; this procedure is particularly to be recommended in the production of copper compounds.

The new dyestuffs, therefore, are complex metal compounds of dyestuffs such as the following:

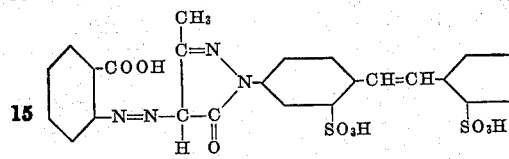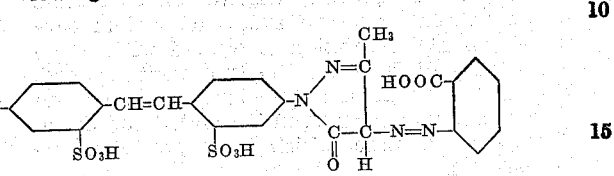

aryl residue of the pyrazolones may belong either to the stilbene or to the dibenzyl series. It is also possible first to convert the 1-aryl-5-pyrazolones from the aforesaid nitro- or amino-hydrazines by coupling with one of the diazo compounds already referred to into azo dyestuffs of the general formula:

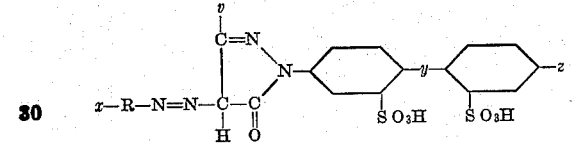

in which R stands for an aromatic nucleus of the benzene or naphthalene series, $x$ stands for an OH- or a COOH-group which stands in ortho-position to the —N=N-group, $v$ stands, for instance, for hydrogen, alkyl, aryl, COOH or COOR' (R'=alkyl), $y$ for a CH=CH- or a $CH_2$—$CH_2$ group, and $z$ for a $NO_2$- or $NH_2$-group, and then to proceed with the conversion of the nitro- or amino-group.

The combination of the aforesaid coupling components and diazotized ortho-hydroxylated or ortho-carboxylated diazotization components to produce azo dyestuffs proceeds, as is usual for pyrazolones, in an acid or an alkaline medium.

The conversion of the azo dyestuffs into metal compounds may as a rule be conducted by treatment of the finished dyestuff with a salt, hydroxide or oxide of one of the metals hereinbefore referred to, for example copper sulfate, copper chloride, copper hydroxide, ammoniacal copper oxide, copper tetramine sulfate, derivatives of copper tetramine sulfate in which the ammonia residues are replaced by the residues of organic bases, such as methylamine or pyridine, chromium chloride, chromium sulfate, chromium fluoride, chromium formate, chromium acetate, chromium hydroxide, sodium chromite, sodium glycerine chromite, nickel chloride, nickel sulfate, cobalt chloride, manganese chloride, and so on. The metallisation may be conducted on the fibre or advantageously in substance by treating or warming a solution or suspension of the dyestuff in admixture with one of the aforesaid salts in an open vessel or under pressure. The same metalliferous dyestuffs can also be obtained by metallising dyestuffs which have been prepared from the 1-aryl-5-pyrazolones here in question and from diazotization components which contain no OH- or COOH-group in ortho-position but contain in ortho-position a substituent which in the course of the metallisation becomes converted into an OH- or COO-group, such as a chlorine or bromine atom or an $OCH_3$-group (which substituents are converted into the OH- it being unknown in what manner the metal is bound at the ortho-hydroxy or ortho-carboxy-azo-group; reference must also be made to the further possibilities afforded by the diazo components hereinbefore mentioned and the formulae of the coupling components given by way of example.

The dyestuffs of the present invention are accordingly complex metal compounds of azo dyestuffs of the general formula

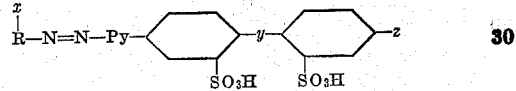

in which $x$ stands for a substituent in ortho-position to the N=N-group which is capable of forming complex compounds with metals, Py stands for the residue of a 5-pyrazolone which is combined in 1-position with the residue

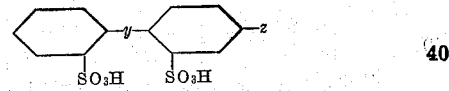

and in 4-position with the azo-residue, $y$ for a CH=CH- or a $CH_2$—$CH_2$-group and $z$ for the conversion product of a nitro-group.

The characteristic properties of the new metalliferous dyestuffs are conditioned by the grouping

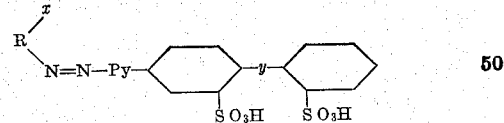

which in particular is responsible for the shade of the dyestuffs, their high fastness to light and their affinity for vegetable fibres, as will be evident from a comparison of the properties of the individual products described in the examples which follow.

When prepared in substance the new products constitute in the dry state yellow to brown or blackish powders which are soluble in water to yellow to orange, brown, greenish, olive and blackish solutions from which they are adsorbed by cellulose fibres yielding dyeings of similar shades which are distinguished by their excellent properties hereinbefore referred to. Details in respect of the manufacture of such dyestuffs and of their properties will be found in the following examples, the number of which could be multiplied as desired. The parts in the examples are by weight.

*Example 1*

13.7 parts of 1-aminobenzene-2-carboxylic acid are diazotized in the usual manner and coupled in an acetic acid medium with 45.1 parts of the 3-methyl-5-pyrazolone of the formula

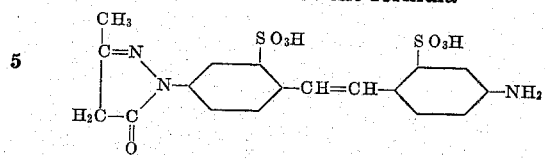

The dyestuff is isolated, dissolved in 1000 parts of water, containing an excess of sodium carbonate, and the solution is treated with phosgene at 40–50° C. When this treatment is ended, that is to say when a free amino-group is no longer present, the dyestuff is isolated and dried. It is a yellow powder which dyes cotton fast yellow shades.

The dyestuff thus prepared is suspended in 3000 parts of water and the suspension is mixed with an ammoniacal copper oxide solution corresponding with 35 parts of crystallized copper sulfate. The whole is stirred at 60–70° C. for about 1 hour, whereupon the metalliferous dyestuff is filtered with suction and cautiously dried. The dry dyestuff containing copper is a brown powder which dyes vegetable fibres and artificial silks of regenerated cellulose excellent yellow shades fast to light. The non-metallised dyestuff corresponds thus to the formula

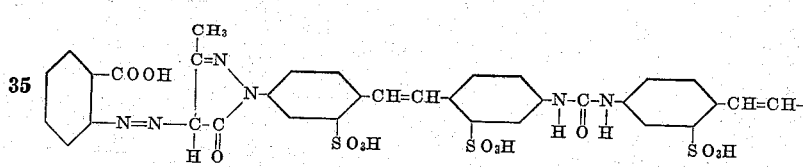

The conversion of the dyestuff into its copper complex may also be conducted in an acid medium by treatment with a copper salt such as copper sulfate.

By combining the diazo compound from 13.7 parts of 1-amino-benzene-2-carboxylic acid with 45.3 parts of the 3-methyl-5-pyrazolonone of the formula

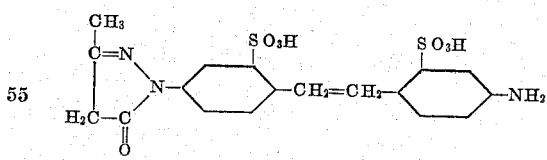

treating the dyestuff with phosgene and converting the product into the complex copper compound as above described there is obtained a dyestuff containing copper which, when dried, constitutes a yellow-brown powder and dyes cotton fast yellow shades, resembling in shade and properties those of the stilbene product.

By suspending 59.9 parts of the dyestuff described in the first paragraph of this example in about 3000 parts of water and treating the suspension with a solution of 30 parts of crystallized nickel sulfate in 200 parts of water for 1 hour at 70–80° C. in the presence of sodium acetate there is obtained the complex nickel compound of the dyestuff which, when dried, is a brownish powder which dyes cotton fast yellow shades with a somewhat orange hue.

The same shades are obtained by first dyeing with the non-metallized dyestuff in the manner usual for dyeing with direct dyestuffs and then after-coppering or after-treating the dyeing with a nickel salt. By treating with an iron salt a dyeing prepared with an alkali salt of the dyestuff there is obtained a dull yellow shade, by treatment with a cobalt salt a yellow shade, with a chromium salt a somewhat greenish-yellow shade and with a manganese salt a yellow shade.

*Example 2*

48.1 parts of the 3-methyl-5-pyrazolone of the formula

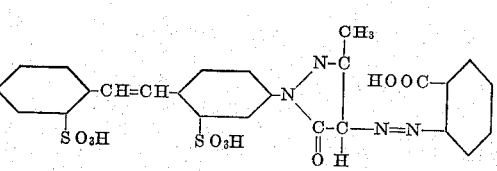

are dissolved in 300 parts of water and 11 parts of sodium carbonate and coupled with the diazo compound prepared as usual from 13.7 parts of anthranilic acid. The dyestuff is isolated and reduced in an aqueous suspension at 50–60° C. with a solution of 21 parts of dextrose and 25 parts of caustic soda solution of 36° Bé. The brown-red dyestuff thus formed is isolated; it is presumed to contain the azoxy- or azo-group and to have the formula

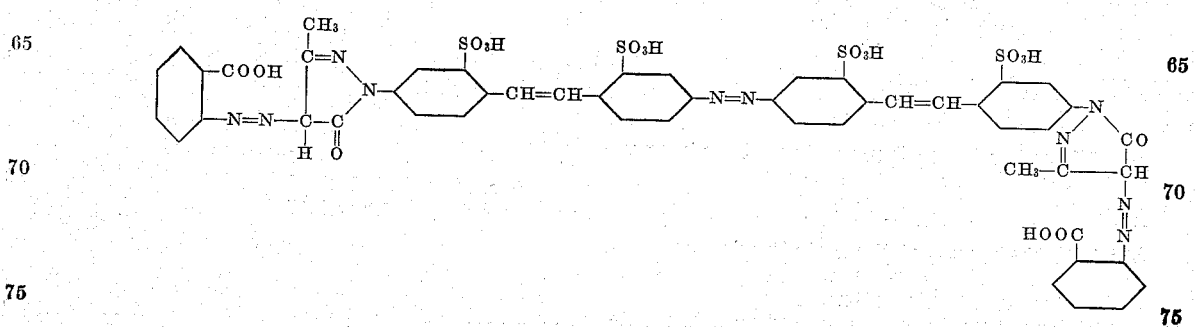

or the formula

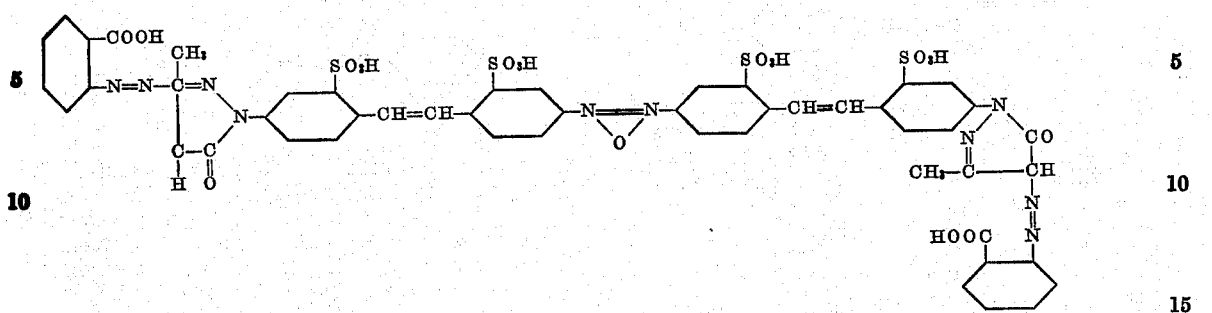

By converting the product into a complex copper compound by treatment with an agent yielding copper as indicated in Example 1, there is obtained a product which dyes vegetable fibres orange shades. The copper compound as well as the compounds of other metals such as nickel, cobalt, chromium and so on can also be produced on the fibre.

What I claim is:

1. The metal compounds of the azo dyestuffs having in the free state the general formula

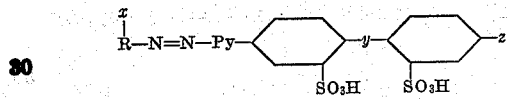

in which R stands for a nucleus of the group consisting of aromatic nuclei of the benzene and naphthalene series, $x$ stands for a lake-forming group, Py stands for the radical of a 5-pyrazolone which is combined in 1-position with the radical

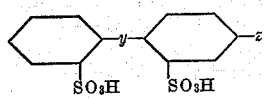

and in 4-position with the azo-group, $y$ stands for a connecting link of the group consisting of —CH=CH— and —CH$_2$—CH$_2$—, and $z$ for a radical comprising at least one nucleus of the group consisting of nuclei of the benzene and naphthalene series united to the radical

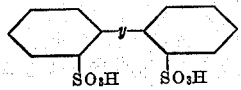

by a connecting link selected from the groups consisting of azo and azoxy groups, which products form yellow to brown powders, dissolve in water to yellow to orange, brown and olive solutions, and dye cotton fast yellow to orange, brown and olive tints which are particularly fast to light.

2. The metal compounds of the azo dyestuffs having in the free state the general formula

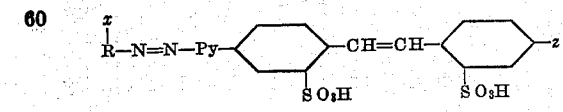

in which R stands for a nucleus of the group consisting of aromatic nuclei of the benzene and naphthalene series, $x$ stands for a lake-forming group, Py stands for the radical of 5-pyrazolone which is combined in 1-position with the radical

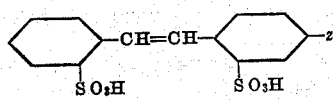

and in 4-position with the azo-group, $z$ stands for a radical comprising at least one nucleus of the group consisting of nuclei of the benzene and naphthalene series united to the radical

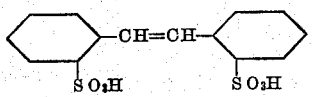

by a connecting link selected from the groups consisting of azo and azoxy groups, which products form yellow to brown powders, dissolve in water to yellow to orange, brown and olive solutions, and dye cotton fast yellow to orange, brown and olive tints which are particularly fast to light.

3. The copper compounds of the azo dyestuffs having in the free state the general formula

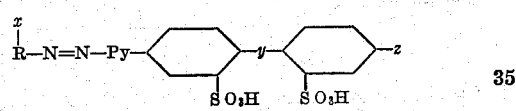

in which R stands for a nucleus of the group consisting of aromatic nuclei of the benzene and naphthalene series, $x$ stand for a lake-forming group, Py stands for the radical of a 5-pyrazolone which is combined in 1-position with the radical

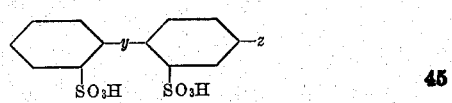

and in 4-position with the azo-group, $y$ stands for a connecting link of the group consisting of —CH=CH— and —CH$_2$—CH$_2$—, and $z$ for a radical comprising at least one nucleus of the group consisting of nuclei of the benzene and naphthalene series united to the radical.

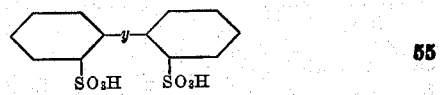

by a connecting link selected from the groups consisting of azo and azoxy groups, which products form yellow to brown powders, dissolve in water to yellow to orange, brown and olive solutions, and dye cotton fast yellow to orange, brown and olive tints which are particularly fast to light.

4. The copper compounds of the azo dyestuffs having in the free state the general formula

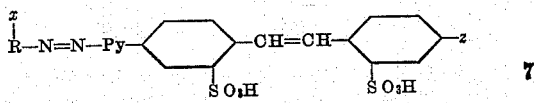

in which R stands for a nucleus of the group consisting of aromatic nuclei of the benzene and naphthalene series, $x$ stand for a lake-forming group, Py stands for the radical of a 5-pyrazolone which is combined in 1-position with the radical

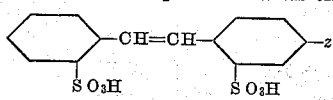

and in 4-position with the azo-group, z stands for a radical comprising at least one nucleus of the group consisting of nuclei of the benzene and naphthalene series united to the radical

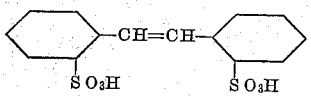

by a connecting link selected from the groups consisting of azo and azoxy groups, which products form yellow to brown powders, dissolve in water to yellow to orange, brown and olive solutions, and dye cotton fast yellow to orange, brown and olive tints which are particularly fast to light.

5. The metal compound of the azo dyestuffs having in the free state the general formula

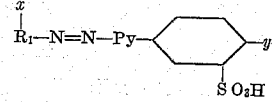

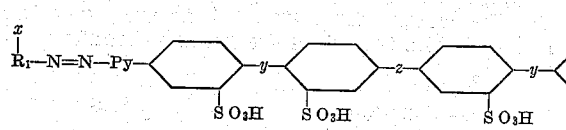

in which $R_1$ and $R_2$ stand for nuclei of the group consisting of aromatic nuclei of the benzene and naphthalene series, $x$ stands for a lake-forming group in ortho position to the —N=N—group, Py stands for the radical of a 5-pyrazolone which is combined in 1-position with the radical

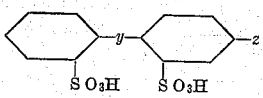

and in 4-position with the azo-group, $y$ stands for a connecting link of the group consisting of —CH=CH— and —CH$_2$—CH$_2$—, and $z$ for a connecting link selected from the group consisting of the azo group and the azoxy group, which products form yellow to brown powders, dissolve in water to yellow to orange, brown and olive solutions, and dye cotton fast yellow to orange, brown and olive tints which are particularly fast to light.

6. The metal compounds of the azo dyestuffs having in the free state the general formula

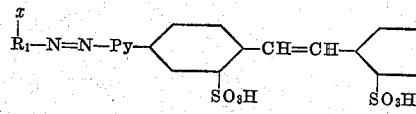

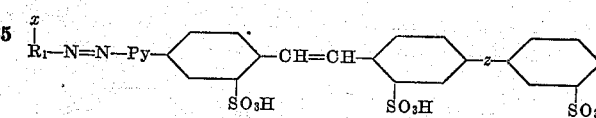

in which $R_1$ and $R_2$ stand for nuclei of the group consisting of aromatic nuclei of the benzene and naphthalene series, $x$ stands for a lake-forming group in ortho position to the —N=N—group, Py stands for radical of a 5-pyrazolone which is combined in 1-position with the radical

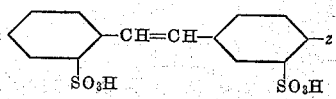

and in 4-position with the azo-group, z stands for a connecting link selected from the group consisting of the azo group and the azoxy group, which products form yellow to brown powders, dissolve in water to yellow to orange, brown and olive solutions, and dye cotton fast yellow to orange, brown and olive tints which are particularly fast to light.

7. The copper compounds of the azo dyestuffs having in the free state the general formula

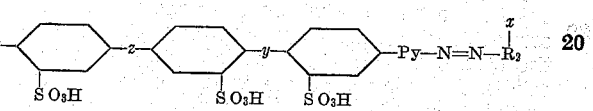

in which $R_1$ and $R_2$ stand for nuclei of the group consisting of aromatic nuclei of the benzene and naphthalene series, $x$ stands for a lake-forming group in ortho position to the —N=N—group, Py stands for the radical of a 5-pyrazolone which is combined in 1-position with the radical

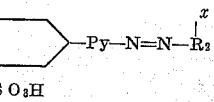

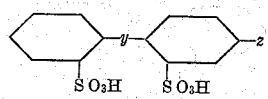

and in 4-position with the azo-group, $y$ stands for a connecting link of the group consisting of —CH=CH— and —CH$_2$—CH$_2$—, and $z$ for a connecting link selected from the group consisting of the azo and the azoxy group, which products form yellow to brown powders, dissolve in water to yellow to orange, brown and olive solutions, and dye cotton fast yellow to orange, brown and olive tints which are particularly fast to light.

8. The copper compounds of the azo dyestuffs having in the free state the general formula

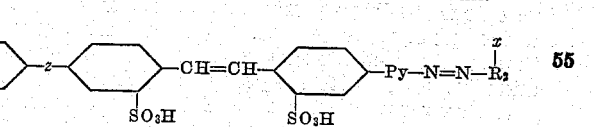

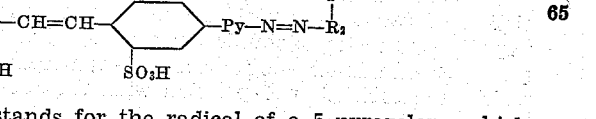

in which $R_1$ and $R_2$ stand for nuclei of the group consisting of aromatic nuclei of the benzene and naphthalene series, $x$ stands for a lake-forming group in ortho position to the —N=N—group, Py stands for the radical of a 5-pyrazolone which is combined in 1-position with the radical

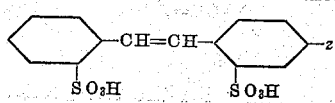

and in 4-position with the azo-group, z stands for a connecting link selected from the group

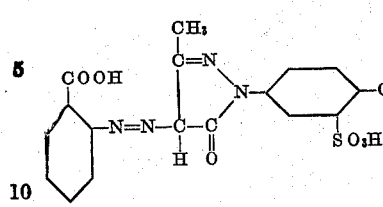

consisting of the azo and the azoxy group, which products form yellow to brown powders, dissolve in water to yellow to orange, brown and olive solutions, and dye cotton fast yellow to orange, brown and olive tints which are particularly fast to light.

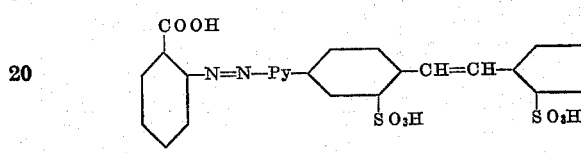

9. The copper compounds of the azo dyestuffs having in the free state the general formula

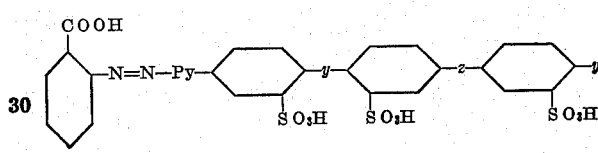

in which Py stands for the radical of a 5-pyrazolone which is combined in 1-position with the radical

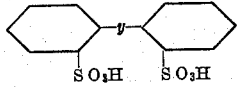

and in 4-position with the azo-group, y stands for a connecting link of the group consisting of —CH=CH— and —CH$_2$—CH$_2$—, and z stands for a connecting link selected from the groups consisting of azo and azoxy groups, which products yield orange tints on the vegetable fiber which are fast to light.

10. The copper compounds of the azo dyestuffs having in the free state the formula

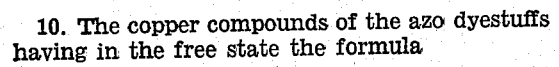
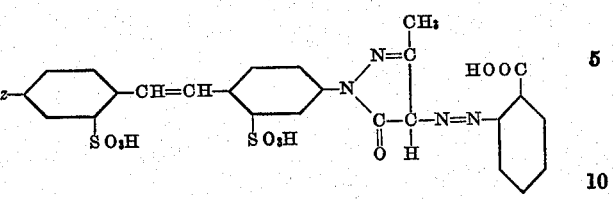

in which z stands for a connecting link selected from the groups consisting of azo and azoxy groups, which product yields on the vegetable fiber yellow tints fast to light.

11. The copper compounds of the azo dyestuffs having in the free state the general formula

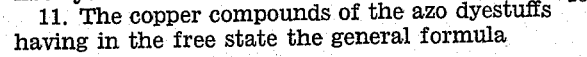
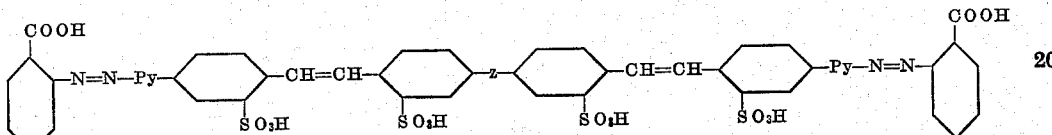

in which Py stands for the radical of a 5-pyrazolone which is combined in 1-position with the radical

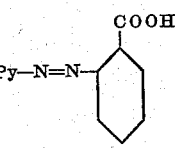
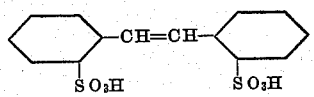

and in 4-position with the azo-group, z stands for a connecting link selected from the groups consisting of azo and azoxy groups, which products yield orange tints on the vegetable fiber which are fast to light.

MAX SCHMID.